United States Patent Office 3,634,515
Patented Jan. 11, 1972

3,634,515
ALKYL-PHENOL, ALKYLENE POLYAMINE, FORMALDEHYDE, ALDEHYDE REACTION PRODUCTS
Edmund J. Piasek, Chicago, Ill., and Robert E. Karll, Munster, Ind., assignors to Standard Oil Company, Chicago, Ill.
No Drawing. Filed Nov. 8, 1968, Ser. No. 774,534
Int. Cl. C07c 87/00, 87/18, 93/00
U.S. Cl. 260—570.5 PA    5 Claims

ABSTRACT OF THE DISCLOSURE

This invention concerns the condensation product of a higher molecular weight alkyl-substituted phenol, an alkylene polyamine, formaldehyde, and an aldehyde reactant having more than one carbon atom or ketone reactant or a mixture of both reactants. These products are useful as ashless dispersants for lubricants.

BACKGROUND OF THE INVENTION

With prolonged engine operation crankcase lubricating oils lose their ability to protect metal engine surfaces as sludge, varnish formers, and corrosive substances accumulate in the oil. Dispersants, which suspend the sludge and varnish formers, and metal containing inhibitors, which counteract the corrosive substances, are added to lubricating oils. Dispersants and inhibitors should be compatible with each other, and preferably, they should enhance each other's performances. However, dispersants sometimes tend to interact physically or chemically with the inhibitors to form complexed products that reduce the dispersing activity of the dispersants and the inhibiting activity of the inhibitors. Researchers are continually looking for dispersants which will maintain their activity and which will not impair the activity of the inhibitors.

SUMMARY OF THE INVENTION

We have discovered novel compositions which serve as dispersants for lubricating oils. These compositions can be prepared by either of two methods. The first, and preferred method, calls for reacting an aldehyde reactant having more than one carbon atom or a ketone reactant or a mixture of said aldehyde and ketone reactants with a high molecular weight Mannich compound. Suitable Mannich compounds are the condensation products of high molecular weight alkyl-substituted phenols, formaldehyde, and alkylene polyamines. The second method calls for reacting an aldehyde reactant having more than one carbon atom or a ketone reactant or a mixture of said aldehyde and ketone reactants with an alkylene polyamine to form an intermediate, and then reacting the intermediate with formaldehyde and a high molecular weight alkyl-substituted phenol.

Products prepared by either method are as good or better dispersants than the aforesaid Mannich products. Moreover, the condensation products of this invention do not complex with metal-containing oxidation and corrosion inhibitors to the same extent as the Mannich products tend to do. Consequently, oils containing the dispersants of this invention, and inhibitors such as divalent metal salts of O,O dihydrocarbyl ester of dithiophosphoric acid or alkaline earth metal salts of phenol sulfides, have more effective in-service use than oils containing the aforesaid Mannich products and such inhibitors. We have found that oils containing from about 0.5 to about 70 weight percent, preferably 0.5 to 25 weight percent, of one or more of the condensation products of this invention give good service.

The amount of reactants employed is not critical and can vary over a wide range. We do, however, prefer to react the phenol, polyamine, formaldehyde, and the aldehyde and/or ketone reactants in the respective molar ratios of about 1:0.1–10:0.1–10:1–4. An excess of aldehyde reactant having more than one carbon atom, formaldehyde, or ketone reactant may be used. The reactions are exothermic, but it is desirable to heat the reaction mixture to a temperature above about 300° F., preferably in the range of from 300° F. to 320° F. This additional heating drives the reaction to completion and removes water from the resultant condensation product.

Suitable high molecular weight alkyl-substituted phenols contain alkyl substituents having at least 40 carbon atoms. These alkyl substituents desirably are branched hydrocarbon chains containing from about 40 to about 20,000 carbon atoms, preferably from 80 to 250 carbon atoms. Polybutyl and polypropyl substituted phenols derived from the alkylation of phenols with liquid, viscous polybutylenes or polypropylenes are the most preferred, and these polybutyl or polypropyl-substituents are desirably located in the para position.

Suitable alkylene polyamines generally come within the following formula:

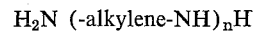

$$H_2N\ (\text{-alkylene-NH})_n H$$

in which $n$ is an integer from about 1 to about 10, and "alkylene" is a saturated divalent hydrocarbon containing from about 2 to about 8 carbon atoms. The preferred alkylene polyamines are ethylene and propylene polyamines, the most preferred being tetraethylene pentamine. Other polyamines include, for example, butylene polyamines, and cyclic homologues of such polyamines, for example, piperazines. Specific examples of alkylene polyamines are: ethylene diamine, diethylene triamine, pentaethylene tetramine, and N-2-aminoethyl-piperazine.

The only critical aspect of our invention is that a sufficient number of active amino groups be reacted with the aldehyde and/or ketone reactants to provide a product which does not readily complex with metal-containing inhibitors. Consequently, the amount of aldehyde and/or ketone reactants used will vary depending on the number of amine groups present which have an active hydrogen. Normally, about 1 to 4 moles of aldehyde or ketone are used per mole of high molecular weight Mannich product.

We refer using aldehyde reactants having more than one carbon atom rather than ketone reactants because these aldehyde reactants provide higher product yields. Preferred aldehyde and ketone reactants contain at least 3 carbon atoms, preferably from 3 to 10 carbon atoms, but the number of carbon atoms in the aldehyde or ketone reactant is not critical. Suitable aldehyde reactants are: propionaldehyde, butyraldehyde, capricaldehyde, 2-ethylhexaldehyde, 2-methylpentaldehyde, 2-ethylbutyraldehyde, and glyoxal. Suitable ketones are: acetone, diethyl ketone, di-propylketone, di-isopropylketone, methylethyl ketone, di-butyl ketone, di-isobutyl ketone, di-tetrabutyl ketone, methyl isobutyl ketone, cyclohexanone, vinyl methyl ketone, acetophenone, and acetonaphthone.

DESCRIPTION OF THE PREFERRED EMBODIMENTS

The preferred embodiment of our invention is the condensation product of (a) a high molecular weight alkyl-substituted phenol wherein the alkyl substituent is a branched hydrocarbon, most preferably polypropyl and polybutyl, containing from about 40 to about 2,000 carbon atoms, (b) an ethylene or propylene polyamine, (c) formaldehyde, and (d) an aldehyde and/or ketone reactant having at least 3 carbon atoms. The high molecular weight alkyl-substituted phenol, polyamine, formaldehyde, and aldehyde and/or ketone are most preferably reacted in the respective molar ratios of about 1:1:2:1–2.

Although the reaction between the various starting materials is very complex, and therefore we cannot demonstrate with certainty the precise formula of the condensation product of this invention, we believe that, when the aldehyde and/or ketone reactants react with the ethylene or propylene polyamine moiety, at least one ring member is formed to make up a portion of molecular structure of the preferred condensation product. In the case of the ethylene polyamine, presumably the following 5-member ring is formed:

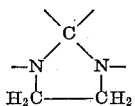

In the case of the propylene polyamine, presumably the following 6-member ring is formed:

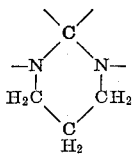

The following examples demonstrate our invention in greater detail.

PREPARATION OF MANNICH COMPOUND

Mix 82 grams of SAE–5W oil, 600 grams of a 44% active polybutyl phenol-oil solution (0.165 mole of polybutyl phenol, number average molecular weight of about 1600), and 34.8 grams (0.152 mole) of tetraethylene pentamine in a suitable flask equipped with stirring apparatus and a nitrogen inlet tube. Heat the mixture to 150° F. and add rapidly 21.6 grams of formalin (0.266 mole of formaldehyde). As formalin is added, the temperature of the reaction mixture rises to 200° F. When all the formalin is added, gradually increase the temperature from 200° F. to 300° F. and inject nitrogen into the flask to remove the water that forms during the condensation reaction. React for 2 hours at 300° F.—320° F., and then filter the product through Celite. The number average molecular weight of this Mannich compound is about 3614.

Example I

Mix 24 grams of SAE–5W oil and 453 grams of a 40% active Mannich compound-oil solution (0.05 mole of the above Mannich compound) in a suitable flask, fitted with stirring apparatus, reflux condenser, a Barrett trap, and a nitrogen inlet tube. Then, slowly add to the flask 16 milliliters (0.18 mole) of n-butyraldehyde. Stir this mixture for about one hour at ambient temperature, then heat to about 300° F., holding the mixture at 300° F. for about 2 hours while injecting nitrogen into the reaction mixture as an aid for water removal. At the end of the heating period filter the reaction mixture through Celite.

Examples II–XI

These examples correspond to Example I with the exception that, in place of the n-butyraldehyde, the following reactants are reacted with the Mannich compound.

| Example | Reactants | Amounts (grams) |
|---|---|---|
| II | Propionaldehyde | 10 |
| III | Capricaldehyde | 18 |
| IV | 2-ethylhexaldehyde | 23 |
| V | 2-methylpentaldehyde | 18 |
| VI | 2-ethylbutyraldehyde | 18 |
| VII | Acetone | 10 |
| VIII | Methylethyl ketone | 13 |
| IX | di-Ethyl ketone | 16 |
| X | (a) di-Isobutyl ketone, and | 12 |
|  | (b) Butyraldehyde | 6 |
| XI | (a) Methylethyl ketone, and | 6 |
|  | (b) Propionaldehyde | 5 |

Example XII

Intermediate Preparation: Mix 94 grams (0.50 mole) of tetraethylene pentamine with 300 milliliters of toluene in a suitable flask equipped with stirring apparatus, reflux condenser, a Barrett trap, and a nitrogen inlet tube. Slowly add 36 grams (0.5 mole) of n-butyraldehyde to the flask over a 30-minute period and then heat to 240° F. The n-butyraldehyde reacts with the tetraethylene pentamine to produce an intermediate (molecular weight of about 224). Completion of the reaction is indicated by the elimination of the stoichiometric amount of water. Increase the temperature of the mixture to 300° F. and hold at this temperature for 2 hours in order to remove the toluene.

Dispersant Preparation: Mix 17 grams (0.076 mole) of the above intermediate, 41 grams of SAE–5W oil, and 300 grams of a 44% active polybutyl phenol-oil solution (0.082 mole of polybutyl phenol (number average molecular weight of about 1600) in a suitable flask equipped with the above-mentioned apparatus. Heat to about 190° F., rapidly adding 11 grams of formalin (0.133 mole of formaldehyde). After the formalin is added, heat the reaction mixture to about 300° F., inject nitrogen into the flask and hold at this temperature for about 2½ hours. The reaction product is then filtered through Celite.

Examples XIII–XXII

The examples correspond to Example XII with the exception that, in place of the n-butyraldehyde, the following reactants are used:

| Example | Reactants | Amounts (grams) |
|---|---|---|
| XIII | Propionaldehyde | 29 |
| XIV | Capricaldehyde | 50 |
| XV | 2-ethylhexaldehyde | 64 |
| XVI | 2-methylpentaldehyde | 50 |
| XVII | 2-ethylbutyraldehyde | 50 |
| XVIII | Acetone | 29 |
| XIX | Methylethyl ketone | 36 |
| XX | di-Ethyl ketone | 43 |
| XXI | (a) di-Isobutyl ketone, and | 35 |
|  | (b) Butyraldehyde | 18 |
| XXII | (a) Methylethyl ketone, and | 18 |
|  | (b) Propionaldehyde | 14 |

L–38 engine test

The L–38 engine test is designed to evaluate high temperature oxidation stability of lubricating oils. In this test, a single cylinder water cooled Labeco oil test engine is operated at 3,150 r.p.m. for 40 hours using the lubricating oil being tested. The test oil is maintained at 300° F. and cooling water is maintained at 195° F. Copper-lead connecting rod bearings of the engine are weighed before and after the 40-hour test period. Bearing weight loss (BWL) is a measure of the effectiveness of the test oil. The lower the bearing weight loss the better in-service use the test oil will provide.

Presented below in the table are the results of L–38 engine tests using the dispersants of this invention and the disclosed polybutyl Mannich compound. The results of these tests clearly indicate the superiority of the present invention. In conducting these tests "ZOP," a zinc dialkyldithiophosphate inhibitor dissolved in SAE-5W oil, was added to two different lubricating oil formulations, A and B. As shown in the table, the anti-corrosive activity of the "ZOP" was maintained at a higher level using the dispersant of this invention than achived using the Mannich compound.

TABLE

| Test oil | Percent volume | | | | BWL (mg.) |
|---|---|---|---|---|---|
|  | ZOP | Polybutyl mannich compound | Dispersant of Example I | SAE #30 oil |  |
| A | 0.62 | 5.0 | 0 | 94.38 | ~120 |
| B | 0.62 | 0 | 5.0 | 94.38 | ~64 |

We claim:
1. The condensation product of (a) a high molecular weight alkyl-substituted phenol wherein the alkyl substituent contains from about 40 to about 20,000 carbon atoms, (b) an alkylene polyamine having the formula

$$H_2N(\text{-alkylene-NH})_nH$$

in which $n$ is an integer from about 1 to about 10, and "alkylene" is a saturated divalent hydrocarbon containing from about 2 to about 8 carbon atoms, (c) formaldehyde, and (d) an aldehyde reactant having from about 2 to about 10 carbon atoms, or a ketone reactant having from about 3 to about 10 carbon atoms, or a mixture of said aldehyde and ketone reactants, said phenol, polyamine, formaldehyde, and aldehyde and/or ketone reactants being reacted in the respective molar ratios of about 1:0.1–10:0.1–10:1–4 and at a temperature to remove water from the resultant condensation product.

2. The condensation product defined in claim 1 wherein said alkaylene polyamine is ethylene polyamine or propylene polyamine.

3. The condensation product defined in claim 2 wherein said polyamine is tetraethylene pentamine.

4. The condensation product defined in claim 2 wherein the phenol, polyamine, formaldehyde, and the aldehyde and/or ketone reactants are reacted in the respective molar ratios of about 1:1:2:1–2.

5. The condensation product defined in claim 4 wherein the aldehyde reactant is propionaldehyde, butyraldehyde, capricaldehyde, 2-ethylhexaldehyde, 2-methylpentaldehyde, 2-ethylbutyraldehyde, or glycoxal; and the ketone is acetone, di-ethyl ketone, di-propylketone, di-isopropylketone, di-butyl ketone, di-isobutyl ketone, di-tetrabutyl ketone, methyl isobutyl ketone, cyclohexanone, vinyl methyl ketone, acetophenone or acetonaphthone.

References Cited
UNITED STATES PATENTS

| | | | |
|---|---|---|---|
| 2,962,442 | 11/1960 | Andress | 252—51.5 |
| 3,036,003 | 5/1962 | Verdol | 252—33.4 |
| 3,413,347 | 11/1968 | Worrel | 260—570.5 PA |
| 3,429,812 | 2/1969 | Kivelevich et al. | 260—570.5 PA X |
| 3,472,773 | 10/1969 | Holst et al. | 260—570.5 PA X |

CHARLES B. PARKER, Primary Examiner

R. L. RAYMOND, Assistant Examiner

U.S. Cl. X.R.

252—51.5 R

PO-1050
(5/69)

UNITED STATES PATENT OFFICE
CERTIFICATE OF CORRECTION

Patent No. 3,634,515                      Dated January 11, 1972

Inventor(s) PIASEK, EDMUND J. and KARLL, ROBERT E.

It is certified that error appears in the above-identified patent and that said Letters Patent are hereby corrected as shown below:

Column 4, line 18 - between "phenol" and "number" the parenthesis should be a comma.

Column 4, line 66 - "achived" should be --achieved--.

Column 4, Table - in heading, "mannich" should be --Mannich--.

Claim 2 - "alkaylene" should be --alkylene--.

Claim 5 - "glycoxal" should be --glyoxal--.

Signed and sealed this 27th day of June 1972.

(SEAL)
Attest:

EDWARD M. FLETCHER, JR.          ROBERT GOTTSCHALK
Attesting Officer                Commissioner of Patents